(12) United States Patent
Michel et al.

(10) Patent No.: US 8,731,780 B2
(45) Date of Patent: May 20, 2014

(54) METHOD FOR OPERATING A MECHATRONIC CHASSIS DEVICE OF A MOTOR VEHICLE

(75) Inventors: Wilfried Michel, Riedenburg (DE); Hugo Müller, Rohrenfels-Ballersdorf (DE); Christoph Kossira, Ingolstadt (DE); Karl-Heinz Meitinger, München (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/811,590

(22) PCT Filed: Jul. 15, 2011

(86) PCT No.: PCT/EP2011/003529
§ 371 (c)(1),
(2), (4) Date: Feb. 20, 2013

(87) PCT Pub. No.: WO2012/010277
PCT Pub. Date: Jan. 26, 2012

(65) Prior Publication Data
US 2013/0173120 A1   Jul. 4, 2013

(30) Foreign Application Priority Data
Jul. 23, 2010   (DE) .......................... 10 2010 032 073

(51) Int. Cl.
*B60W 10/22*   (2006.01)
*B60W 10/20*   (2006.01)

(52) U.S. Cl.
USPC .......................................................... 701/42

(58) Field of Classification Search
CPC ............................. B60W 10/22; B60W 10/20
USPC ........................................................... 701/42
See application file for complete search history.

(56) References Cited

U.S. PATENT DOCUMENTS 6,293,561 B1 *   9/2001   Goetzen et al. ............. 280/5.52
6,634,654 B2 *  10/2003   Mackle et al. ............ 280/5.521

(Continued)

FOREIGN PATENT DOCUMENTS

DE   198 57 394   6/2000
DE   102008054209   6/2009

(Continued)

OTHER PUBLICATIONS

International Search Report issued by the European patent Office on Oct. 25, 2011 in PCT/EP2011/003529.

*Primary Examiner* — Thomas Tarcza
*Assistant Examiner* — Alex C Dunn
(74) *Attorney, Agent, or Firm* — Feiereisen LLC

(57) ABSTRACT

A method for operating a mechatronic chassis device of a motor vehicle, wherein the mechatronic chassis device has an arrangement with two servomotors which, when activated, individually change both a toe angle (δ) of a wheel and a camber angle (ε) of the wheel. The servomotors are controlled on the basis of target values in a predetermined manner, wherein if a first servomotor cannot be placed into operation, an emergency program is started and the second servomotor is controlled in a manner different from the predetermined manner such that a lateral force on the wheel is adjusted to a predetermined desired value.

8 Claims, 2 Drawing Sheets

(56) References Cited

U.S. PATENT DOCUMENTS

| | | | |
|---|---|---|---|
| 7,389,998 B2* | 6/2008 | Kondo et al. | 280/93.502 |
| 2008/0243339 A1 | 10/2008 | Nishimori et al. | |
| 2009/0157246 A1* | 6/2009 | Mori et al. | 701/22 |
| 2009/0177348 A1 | 7/2009 | Yanagi | |
| 2010/0198441 A1* | 8/2010 | Mizuno et al. | 701/22 |
| 2011/0101637 A1* | 5/2011 | Shibuya | 280/86.758 |

FOREIGN PATENT DOCUMENTS

| | | |
|---|---|---|
| DE | 102008029258 | 12/2009 |
| EP | 1 892 180 | 2/2008 |
| EP | 1 935 759 A2 | 6/2008 |
| EP | 1 975 041 A2 | 10/2008 |
| EP | 2 078 663 A1 | 7/2009 |
| JP | 2009 227202 | 10/2009 |
| WO | WO 2009/052914 | 4/2009 |

* cited by examiner

METHOD FOR OPERATING A MECHATRONIC CHASSIS DEVICE OF A MOTOR VEHICLE

CROSS-REFERENCES TO RELATED APPLICATIONS

This application is the U.S. National Stage of International Application No. PCT/EP2011/003529, filed Jul. 15, 2011, which designated the United States and has been published as International Publication No. WO 2012/010277 and which claims the priority of German Patent Application, Serial No. 10 2010 032 073.0, filed Jul. 23, 2010, pursuant to 35 U.S.C. 119(a)-(d).

BACKGROUND OF THE INVENTION

The invention relates to a method for operating a mechatronic chassis device of a motor vehicle.

It is assumed that a mechatronic suspension device which allows setting a toe angle of a wheel and a camber angle of the same wheel includes two servomotors. However, each of these servomotors are configured as part of an associated device to not only set one of the angles; instead, each servomotor alone should, when activated, simultaneously change the toe angle of the wheel and the camber angle of the wheel.

A chassis device with the aforementioned properties is disclosed, for example, in WO 2009/052914 A1. The chassis device described therein allows setting the toe angle and camber angle in a particularly simple manner without introducing undue mechanical complexity. The wheel suspension for motor vehicles from WO 2009/052914 A1 is illustrated in the FIGS. 1 and 2 of the present application. The wheel carrier 3 has a wheel-side supporting member 17 on which a vehicle wheel 1 is rotatably mounted. The wheel carrier further includes an axle-side supporting element 19. The two support elements 17 and 19 are interconnected by an actuator 21. This interconnected actuator 21 includes a wheel-side rotary member 23, which is connected to the supporting element 17 and an axle-side rotary member 25, which is connected to the support element 19. Each rotary member 23, 25 is able to rotate about an axis 27, 28 (FIG. 2). The rotation takes place with the aid of servomotors 38 and 39. When rotating by a rotation angle α, the rotary member 23 moves with a tumbling motion about the rotation axis 27. Simultaneously or with a time offset, the rotary member 25 can be rotated by a rotation angle β relative to the support element 19. When rotating the two rotary members 23, 25, the wheel-side rotary member 23 is deflected by a pivot angle φ relative to the axle-side rotary member 25. A desired toe angle δ and a desired camber angle ε of the wheel 1 can be set by suitably adjusting the rotation angles α and β of the respective rotary members 23, 25.

It will be assumed that the servomotors are controlled in a predetermined manner, see the connections 51 for a control unit 53. The control unit 53 processes target values relating to the toe angle δ and the camber angle ε; to implement the target values, the servomotors are then driven in a predetermined manner, as disclosed in WO 2009/052914 A1.

However, there is a risk that one of the servomotors cannot be operated, either because it has an inherent failure, or because the connection 51 to the control unit 53 is inoperative.

Since the failure of these components cannot be predicted or controlled, it may happen that a certain toe angle and a certain camber angle are set at a certain time of a failure, which should not to remain permanently set. On the other hand, not every desired track angle in combination with any desired camber angle can be set with the remaining operative servomotor alone.

SUMMARY OF THE INVENTION

It is an object of the present invention to increase the operational safety of a motor vehicle having a chassis device with the aforementioned characteristics.

The object is attained with a method for operating a mechatronic chassis device of a motor vehicle, wherein the device has as part of such an arrangement two servomotors so that each of the two servomotors individually changes, when activated, both a toe angle of a wheel and a camber angle of the wheel, wherein the servomotors are driven in a predetermined manner based on target values. Accordingly, when a first servomotor cannot be placed in operation, an emergency program is started, and the second servomotor is driven in a manner different from the predetermined manner.

In other words, the second servomotor is not simply turned off and the accidentally adjusted toe angle and the accidentally adjusted camber angle are not accepted as such. On the other hand, the second servomotor is not operated as if the first servomotor were still functioning. The emergency program can thus take into consideration that not all combinations of toe angle—camber angle can be any longer freely adjusted. It is thus possible to strive for a compromise.

It is hereby no longer entirely important that a desired toe angle and a desired camber angle are precisely adjusted, i.e. that a target setting is implemented in a predetermined manner. The focus is instead on safety, which can be defined, for example, based on the lateral force applied on the wheel. Preferably, the second servomotor is controlled in the emergency program such that a lateral force on the wheel is adjusted to have a predetermined target value.

The toe angle and the camber angle together affect the lateral force. The lateral force is the force which forces the motor vehicle from moving in a straight line into a turn. To create a particular driving condition, a target value for the lateral force can be defined. To still ensure safe steering, it is advantageous when the target value for the lateral force depends on a steering angle set on the steering handle or steering wheel of the motor vehicle: When driving through a curve, the target value for the lateral force may be adjusted so that the desired curve is traversed safely, whereas the lateral force can be adjusted to be substantially zero when driving in a straight line.

In normal operation, the two servomotors may not always be able to adjust all possible angles due to software-based limitations. In this case, certain combinations of values for toe angles and camber angles may be excluded. However, because various combinations of values may already not be attainable as a result of the failure of a servomotor, at least those combinations of values for toe angles and camber angles are then preferably allowed in the emergency program (as additional value combinations), which are otherwise excluded. This increases the flexibility; for example, the lateral force can be more accurately adjusted to a target value.

The inventive method can also be extended to include more than one wheel. In particular, the arrangement with the two servomotors, which simultaneously change the toe angle and the camber angle of a wheel, is typically installed a second time on a side of the motor vehicle opposite to the aforementioned wheel, i.e. once on the left side of the motor vehicle and once on the right side of the motor vehicle. According to the invention, if a servomotor of one of the arrangements fails, at least one servomotor on the respective other arrangement disposed on the opposite side of the motor vehicle is controlled by the emergency program in a manner different from the usual manner. Through intervention on the wheel, which is located on one side opposite the side on which the servomotor is not operative, the motor vehicle can still have excellent stability in spite of the failure of the first servomotor on the one side of the motor vehicle.

The method is preferably used with the type of mechatronic chassis device disclosed in WO 2009/052914 A1 and described above. Control electronics may be provided; however, the detailed design of the control electronics is not important in this context. Preferably, however, a control unit is configured to execute the emergency program, if necessary.

In one aspect, a mechatronic chassis device is provided, wherein the control device allows execution of the emergency program.

BRIEF DESCRIPTION OF THE DRAWING

Preferred embodiments of the invention will now be described with reference to the drawings, in which.

DETAILED DESCRIPTION OF PREFERRED EMBODIMENTS

Figure 1:
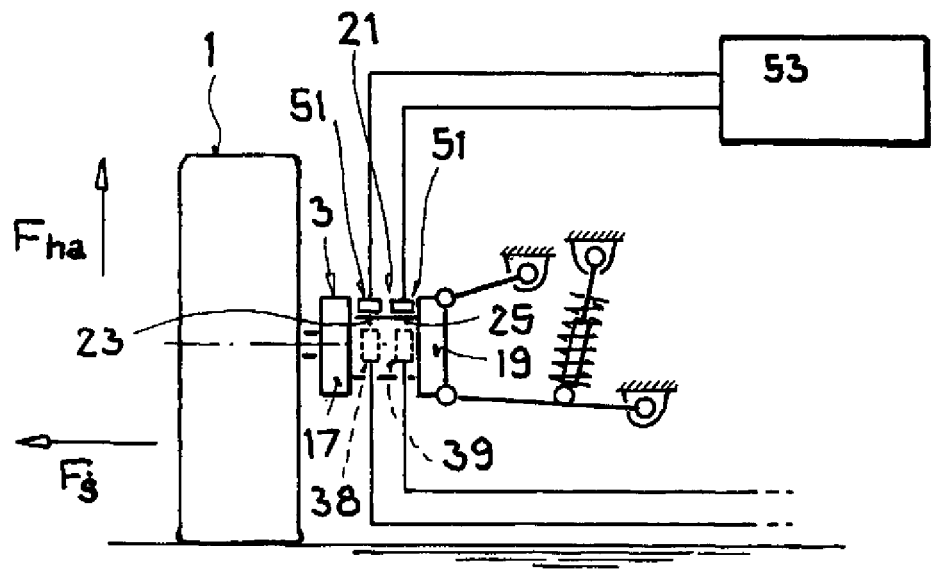
FIG. 1 illustrates a schematic sectional view of a conventional mechatronic chassis device.
Figure 2:
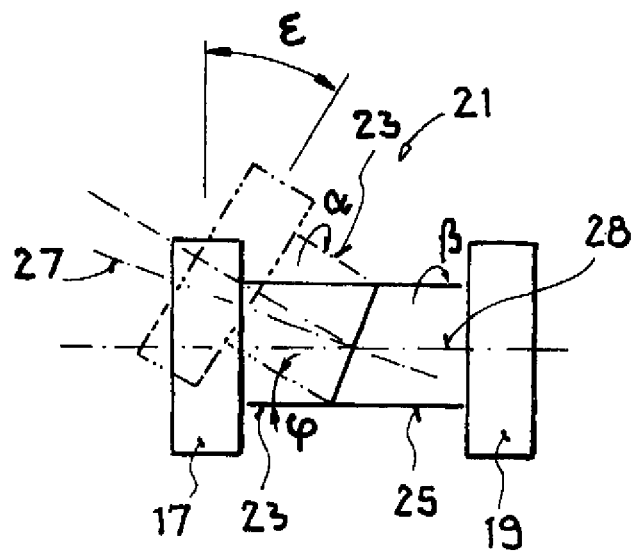
FIG. 2 shows in a more detail diagram the wheel carrier used in the corresponding mechatronic chassis device of FIG. 1.
Figure 3:
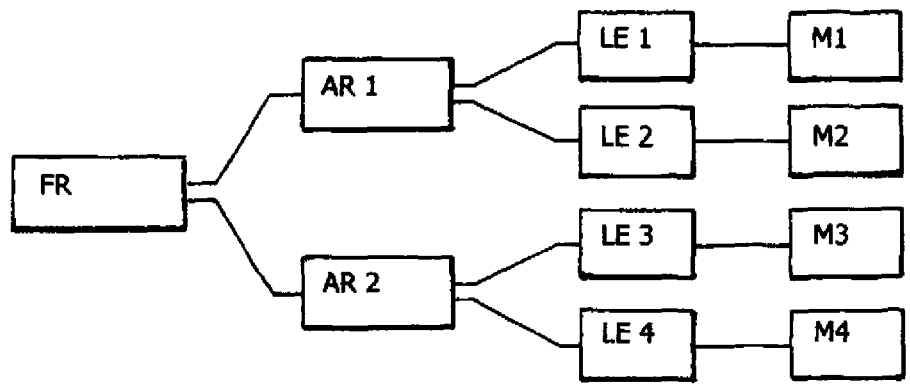
FIG. 3 shows a schematic diagram of the hierarchy of control units in a motor vehicle, in which the present invention can be used.

The mechatronic chassis device of FIG. 1 is to be provided on both wheels on an axle of a motor vehicle according to the invention. In FIG. 3, the respective servomotors 38 and 39 for the left side are designated as M1 and M2 and for the right side as M3 and M4. Respective electronic control units are associated with each of the servomotors M1 to M4, which are also referred to as "Power Electronics" and which are therefore abbreviated with the abbreviation LE1 to LE4. They correspond to the connection 51 of FIG. 1. One control unit, which can also be referred to as "Actuator Controller" and which corresponds to the control unit 53 of FIG. 1, is associated as a master with each of two power electronics. The actuator controller 1, labeled "AR1" in FIG. 3, is responsible for the servomotors M1 and M2 on the left wheel, the actuator controller "AR2" for the right side. A chassis controller FR (control unit) is additionally associated with the two actuator controllers AR1 and AR2 as a master.

The toe angle and camber angle to be set are determined in the chassis controller. Each of the actuator controllers AR1 and AR2 then determines which servomotor is to perform which rotation. Accordingly, the actuator controllers AR1 and AR2 transmit commands to the power electronics LE1 and LE2 and LE3 and LE4, respectively, which then apply an electric current to the corresponding motors M1 and M2 or M3 and M4. The inventive process is executed on the plane of the actuator controllers AR1 and AR2 and runs on one of these controllers.

In principle, in one embodiment, the method can also be executed on the plane of the chassis controller FR; however, this is not preferred.

Figure 4:
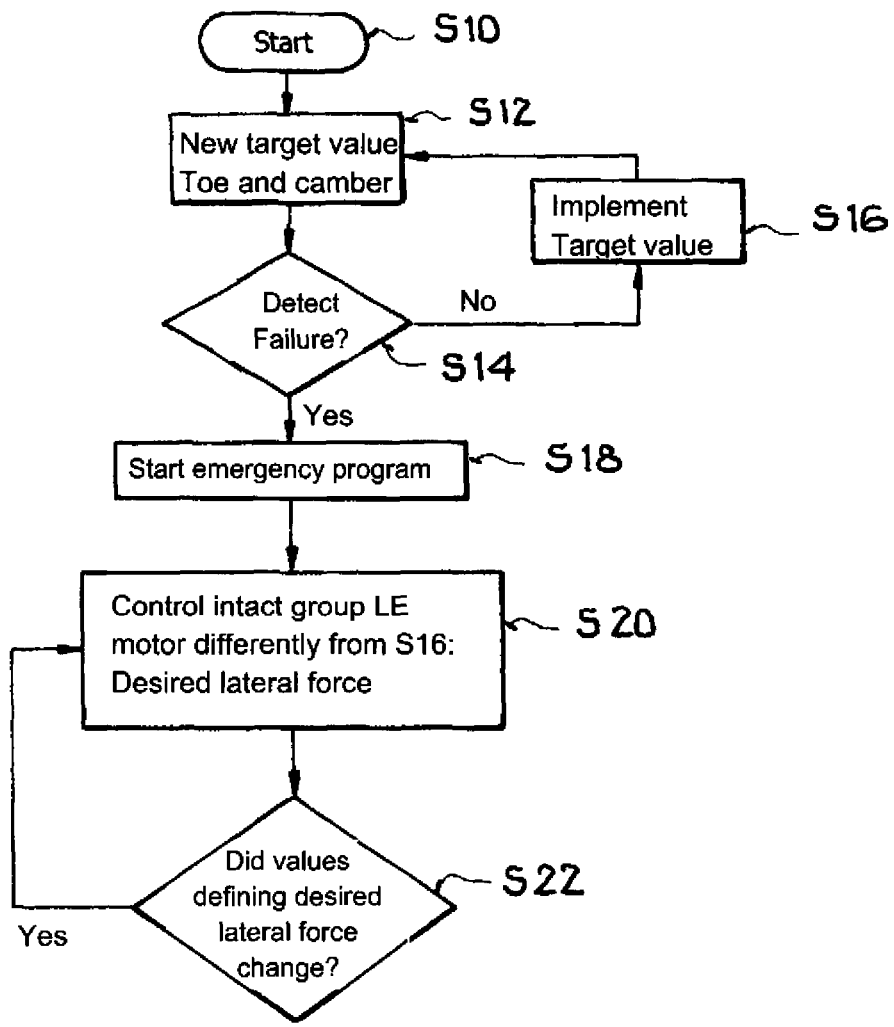
FIG. 4 shows a flow diagram for explaining an embodiment of the inventive process.

According to FIG. 4, the inventive process begins at step S10, with the first actual step indicating that the chassis controller FR generates a new target setting for toe and camber which is received by an actuator controller AR1, AR2. At step S14, the actuator controllers AR1 and AR2 then check whether a failure occurred in the subordinated units LE1, LE2 and ME1, ME2. (It is assumed here that only one error occurs at one time.) As long as no error occurs, the target setting is implemented by the actuator controller AR1 at step S16, as described above. At step S12, a new desired setting is then generated, and an error check is again performed at step S14. If at some point an error is found at step S14, for example, because the motor M1 has failed or because the associated power electronics LE1 has failed, or both, an emergency program is started at step S18. The associated actuator controller AR1 then controls the intact group composed of the power electronics LE2 and the motor M2, however, in a different way than would be done at step S16: When implementing the target setting, it is assumed that control commands can be transmitted to both power electronics LE1 and LE2. In the present case, however, control commands are only transmitted to the power electronics LE2 for activating the motor M2, taking into account the failure of the motor M1 and its associated power electronics LE1. In particular, it will be ensured that a lateral force $F_S$, which is defined as being perpendicular to the motor vehicle's vertical axis Fha and illustrated in FIG. 1, is controlled to a desired value or adjusted to be as close as possible to the desired value. The chassis controller FR now replaces the toe-camber combination previously set by the chassis controller FR with a new target value for toe and camber, which produces in the actual driving situation a value for the lateral force $F_S$ that is as close as possible to the value for the lateral force defined by the original toe-camber combination.

It is then checked at step S22, whether the quantities defining the desired lateral force have changed. Such quantity may include, for example, the steering angle set at a steering handle or steering wheel of the motor vehicle: the greater the steering angle is, the greater is the desired lateral force. Additional quantities defining the desired lateral force are the speed or the rotation speed on the wheel 1.

After a change in the quantities defining the desired lateral force, the process transitions again to step S20, and the new desired lateral force is controlled.

The method of FIG. 4 ends when the failure has been repaired. To encourage a motor vehicle owner to bring his motor vehicle in to be repaired, a warning signal may be outputted, if necessary, in particular simultaneously with the step S18.

The invention claimed is:

1. A method for operating a mechatronic chassis device of a motor vehicle having a first arrangement with two first servomotors, each of the two first servomotors individually changing upon activation both a toe angle of a first wheel and a camber angle of the first wheel, comprising the steps of:
controlling the two first servomotors in a predetermined manner based on target values for the toe angle and the camber angle,
starting an emergency program when a first of the two first servomotors cannot be placed in operation, and
controlling the second of the two first servomotors with the emergency program in a manner different from the predetermined manner, such that a lateral force on the first wheel is adjusted to a predetermined desired value.

2. The method of claim 1, wherein the predetermined desired value depends on a steering angle set on a steering handle.

3. The method of claim 1, wherein the predetermined desired value corresponds to a minimum value of the lateral force.

4. The method of claim 1, wherein the emergency program allows value combinations for toe angles and camber angles in addition to the target values.

5. The method of claim 1, wherein the mechatronic chassis device comprises a second arrangement for a second wheel with two second servomotors, each of the two second servomotors of the second arrangement individually changing upon activation both a toe angle of a second wheel and a camber angle of the second wheel, wherein the two second servomotors of the second arrangement are also controlled in a predetermined manner based on target values, wherein in the emergency program, at least one of the two second servomotors of the second arrangement is also controlled in the manner different from the predetermined manner.

6. The method of claim 5, wherein the first and second wheels are disposed on opposite sides of the motor vehicle.

7. The method of claim 1, comprising the steps of:
coupling a wheel-side support element of a wheel carrier, which supports a motor vehicle wheel for rotation, and an axle-side support element of the wheel carrier by way of an actuator having a wheel-side rotary member and an axle-side rotary member, and
rotating one of the wheel-side rotary member and the axle-side rotary member relative to the other axle-side rotary member or wheel-side rotary member with a servomotor associated with the one rotary member about a rotation axis associated with the one rotary member.

8. A mechatronic chassis device comprising:
a wheel carrier which comprises a wheel-side support element supporting a vehicle wheel for rotation and an axle-side support element,
an actuator coupling the wheel-side support element and the axle-side support element together, wherein the actuator comprises a wheel-side rotary member and an axle-side rotary member,
a servomotor associated with each of the axle-side rotary member and the wheel-side rotary member for rotating the axle-side rotary member and the wheel-side rotary member about corresponding rotation axes, and
control devices configured to
control the servomotors in a predetermined manner based on target values for a toe angle and a camber angle,
start an emergency program when a first of the servomotors cannot be placed in operation, and
control a second of the servomotors with the emergency program in a manner different from the predetermined manner, such that a lateral force on the vehicle wheel is adjusted to a predetermined desired value.

\* \* \* \* \*